Patented June 14, 1927.

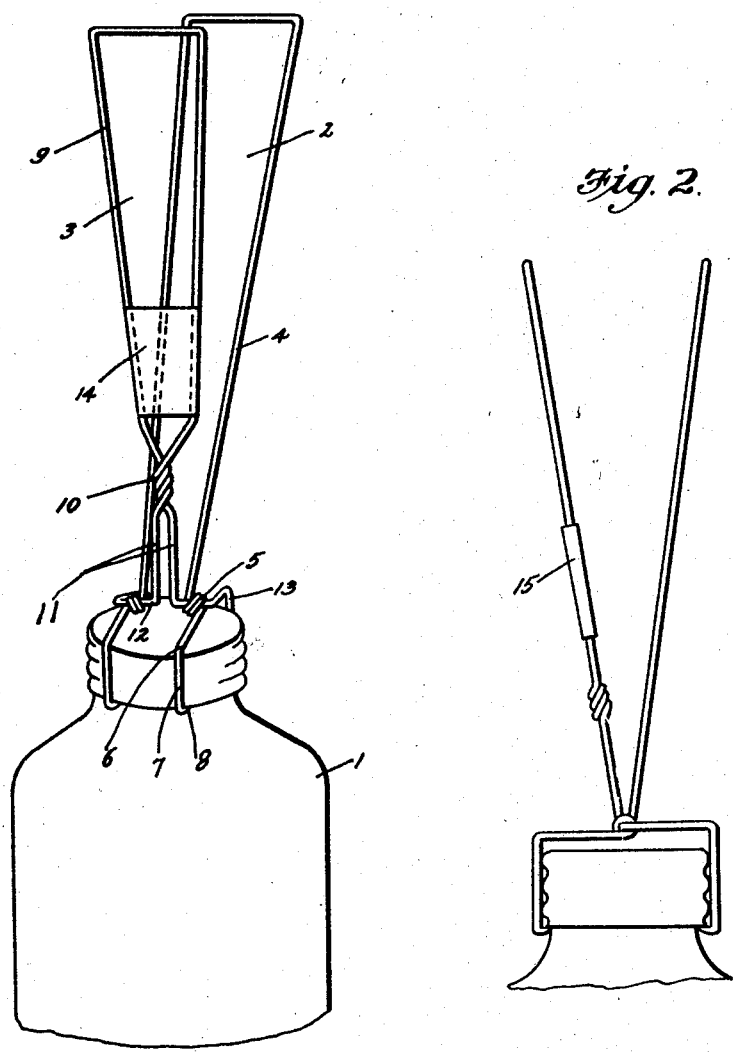

1,632,664

UNITED STATES PATENT OFFICE.

JONAS M. MILLER, OF PLAIN CITY, OHIO.

FRUIT-JAR LIFTER.

Application filed June 1, 1926. Serial No. 113,050.

The object of my said invention is the provision of a fruit jar lifter, susceptible of being easily and inexpensively formed of wire, and adapted to be readily applied to a fruit jar or the like, and to operate after the manner of a pair of pliers in taking secure hold of a fruit jar and precluding the accidental release of the same.

To the attainment of the foregoing, the invention consists in the improvement as hereinafter described and definitely claimed.

In the accompanying drawings, forming part of this specification:

Figure 1 is a perspective showing my improved lifter in use.

Figure 2 is a view in edge elevation showing the lifter with its jaws properly applied to the flange adjacent to the upper end of a fruit jar or the like.

Similar numerals of reference designate corresponding parts in both views of the drawings.

The jar 1 illustrated may be of the ordinary construction or of any other construction adapted for the use to advantage of my novel lifter, and at this point I would have it understood that my lifter is adapted to be readily applied to and used in conjunction with fruit jars of different sizes.

As best shown in Figure 1, my novel lifter comprises two handle members 2 and 3, both members 2 and 3 being of general loop form, and the arms 4 of the member 2 being merged at their lower ends into coils 5, and the said coils 5, in turn, being merged into jaws 6 of general angular form including pendent portions 7 that terminate in toes 8 adapted to engage under the flange near the upper end of the jar. The arms 9 of the handle member 3 are twisted together, as designated by 10, and below the said twisted portion 10, said arms 9 are carried downwardly as designated by 11 in substantial parallel relation, and the lower ends of the portions 11 are merged into oppositely extending lateral arms 12 which are journaled in the before mentioned coils 5. Outwardly beyond the coils 5, the said portions 12 of the handle member 3 are merged into jaws 13, similar in form and construction to the jaws 7 and adapted to engage the before mentioned flange of the jar at points opposite to the points of engagement of the toes 8 on the jaws 7.

It will be apparent from the foregoing that my novel lifter is adapted to operate after the manner of a pair of pliers and that when the handle members 3 are held together, the jaws 7 and 13 will be held in powerful engagement with the flange near the top of the jaw 1 and hence there is no liability of the jar being casually released from the lifter. Again it will be noted that the loop-form of the handle members 2 and 3 is materially advantageous, inasmuch as it is feasible for an operator to extend his or her fingers through the loop and use the handle members 2 and 3 in the manner of bails for the convenient carriage of the jar in the lifter, and for the holding of the upper ends of the handle members 2 and 3 together with a view to effectively preventing release of the jar from the jaws 7 and 13. Manifestly when the upper ends of the handle members 2 and 3 are moved away from each other, the terminals or toes of the jaws 7 and 13 will be disengaged from the mentioned flange of the jar, whereupon the lifter may be expeditiously and easily disassociated from the jar and as readily applied to another jar. It will also be appreciated that the lifter is adapted for use to advantage in conjunction of jars of different sizes, and that the lifter is susceptible of being inexpensively manufactured without the employment of expensive machinery, and that the lifter is entirely free of delicate parts such as are likely to get out of order after a short period of use.

At 14, I show the handle member 3 as embodying a plate, with barrels 15 at its side edges receiving the pendent arms of the said handle member, the plate 14 being connected in the manner described of itself to the said pendent arms of the member 3, and being designed to lend increased stiffness and strength to the handle member 3, and being also designed, when desired, to bear any suitable inscription such as the name and trade-mark of the manufacturer of the device.

I have specifically described the preferred embodiment of my invention in order to impart an exact understanding of the said embodiment in all of its details. I do not desire, however, to be understood as limiting myself to the precise construction shown and described, my invention being defined by my appended claims within the scope of which modifications may be made without departure from my invention.

Having described my invention, what I claim and desire to secure by Letters Patent, is:—

1. A fruit jar lifter comprising two loop-shaped handle members, one of the said members having pendent side arms and coils at the lower ends of said arms, and also having at the opposite ends of the coils angular jaws terminating in toes adapted to engage the flange near the upper end of a fruit jar, and the other handle member having pendent side arms twisted together at an intermediate point in the length of the member and also having below the twisted portions spaced portions and having at the lower ends of said spaced portions oppositely extending arms journaled in the before mentioned coils of the first-named member, and the said arms being provided outwardly beyond said coils with angular jaws having toes at their ends.

2. A fruit jar lifter comprising two loop-shaped handle members, one of the said members having pendent side arms and coils at the lower ends of said arms, and also having at the opposite ends of the coils angular jaws terminating in toes adapted to engage the flange near the upper end of a fruit jar, and the other handle member having pendent side arms twisted together at an intermediate point in the length of the member and also having below the twisted portions spaced portions and having at the lower ends of said spaced portions oppositely extending arms journaled in the before mentioned coils of the first-named member, and the said arms being provided outwardly beyond said coils with angular jaws having toes at their ends; the handle member with the coil at an intermediate point in the length thereof being equipped with a plate extending between and connected of itself to the pendent arms of the handle member and extending between said arms and adapted to lend increased rigidity and strength thereto and also adapted to bear an inscription.

In testimony whereof I affix my signature.

JONAS M. MILLER.